May 24, 1927.
L. W. MELCHER
1,629,804
CONTROLLING MECHANISM FOR VARIABLE SPEED TRANSMISSIONS
Filed Jan. 7, 1926 3 Sheets-Sheet 3
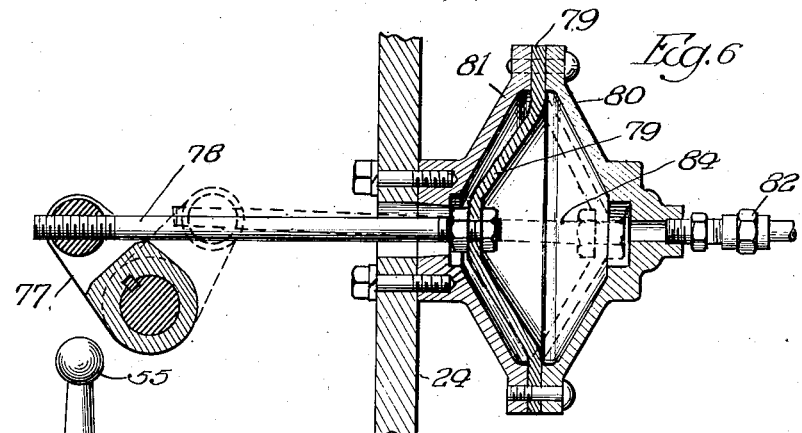
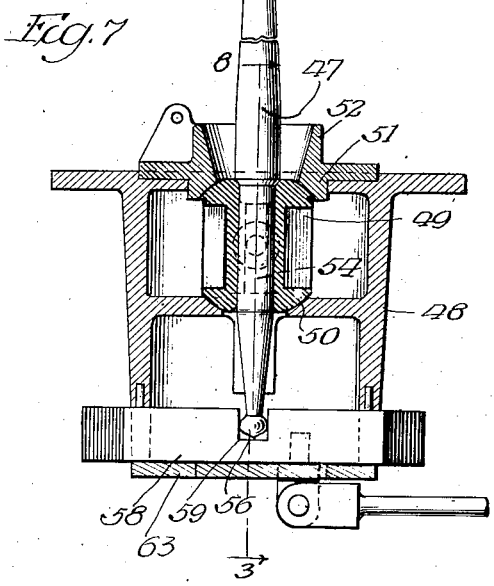
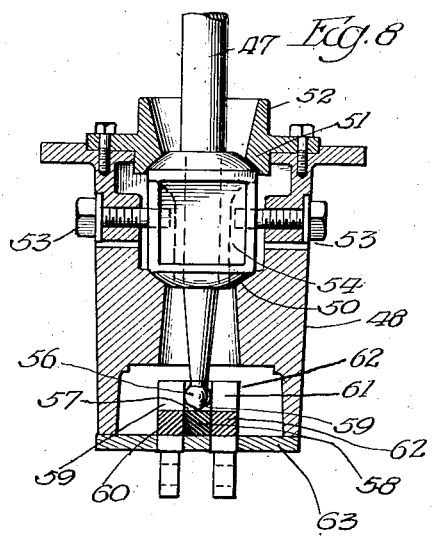
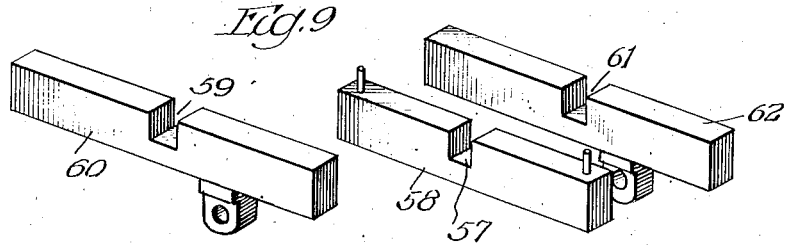

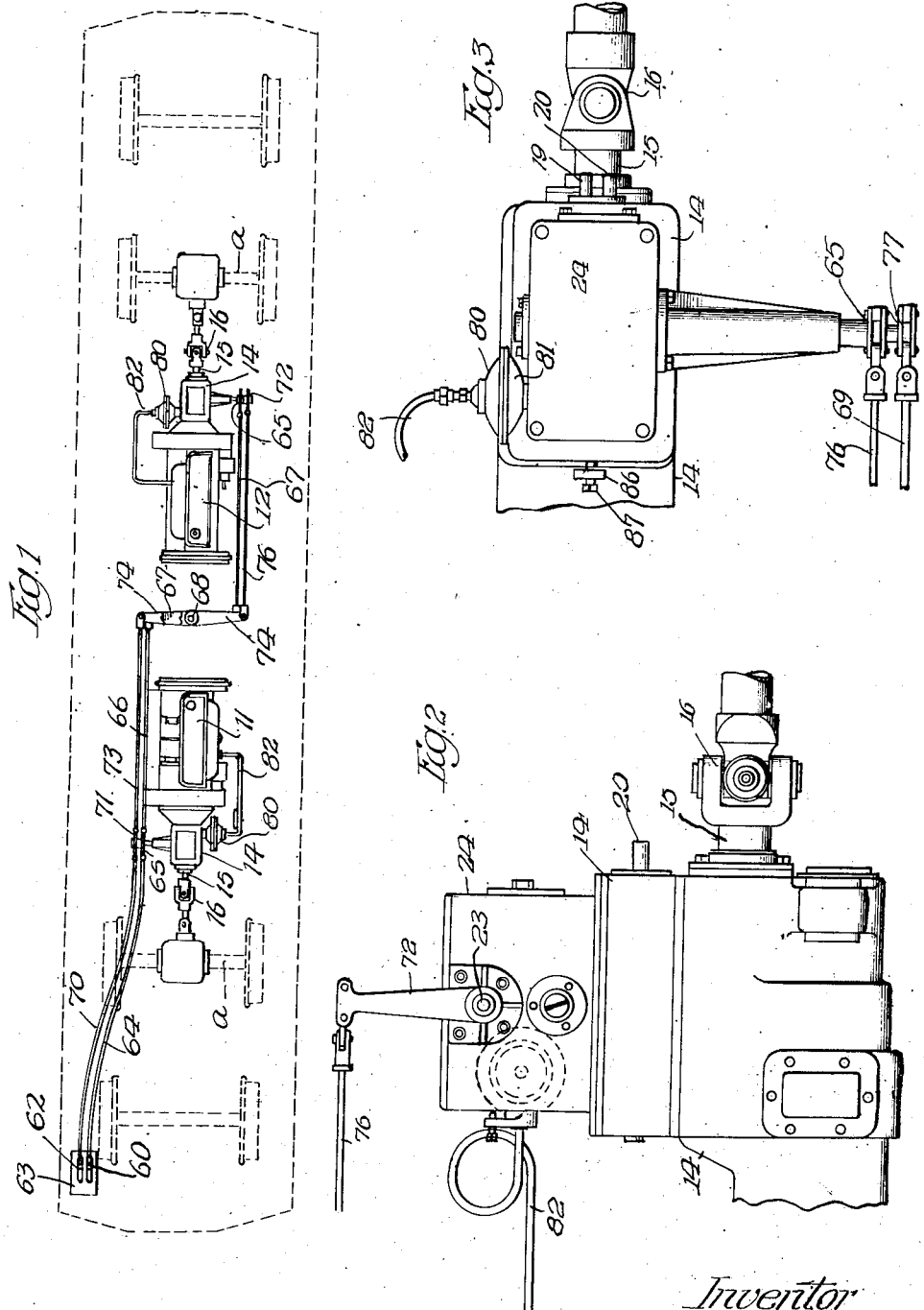

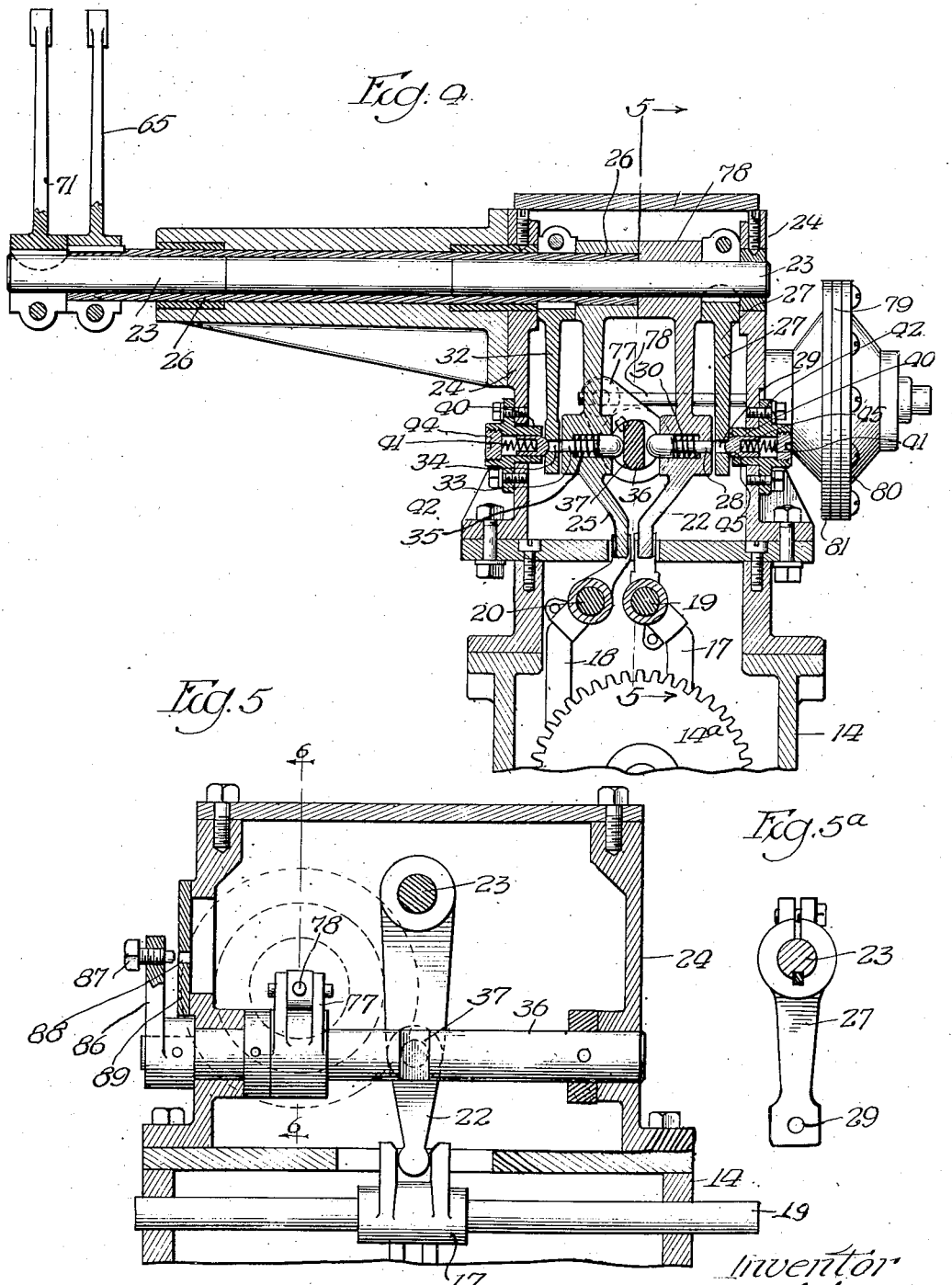

Patented May 24, 1927.

1,629,804

UNITED STATES PATENT OFFICE.

LEE W. MELCHER, OF WEST DEPERE, WISCONSIN.

CONTROLLING MECHANISM FOR VARIABLE-SPEED TRANSMISSIONS.

Application filed January 7, 1926. Serial No. 79,752.

The invention relates to controlling devices for variable speed transmissions for motor driven vehicles.

In the operation of motor driven railway cars, it has been found advantageous to employ two or more motors, so that when the vehicle is under a heavy load, the power of the motors may be cumulatively applied, and when under a light load, it may be propelled by a single motor, the other being idle to reduce the cost of operation. In practice, it has also been found desirable to control the transmission gearings, operated by both of the motors, from a single controlling device or lever, so that when both motors are in operation, it is not necessary for the operator to manipulate separate devices in controlling the variable speed transmissions.

The primary object of the invention is to provide a controlling system or mechanism for variable speed transmissions in which provision is made for automatically disconnecting the transmission mechanism which is connected to be driven by one of the motors when the latter is idle. As a result, the operator can conveniently control a plurality of transmissions from a single lever or controlling device with either one or more than one motor in operation.

Other objects of the invention will appear from the specification.

The invention consists in the several novel features hereinafter set forth and more particularly defined by claims at the conclusion hereof.

In the drawings: Fig. 1 is a diagrammatic plan of a railway car equipped with the invention. Fig. 2 is a side elevation, and Fig. 3 is a plan of one of the transmissions. Fig. 4 is a transverse section through the controlling mechanism for one of the transmissions. Fig. 5 is a section on line 5—5 of Fig. 4. Fig. 5ª is a detail of one of the shifter arms. Fig. 6 is a section on line 6—6 of Fig. 5. Figs. 7 and 8 are sections showing the gear-shift lever and its mounting. Fig. 9 is a detail of the slide-bars and the locking bar associated with the gear-shift lever.

The invention is exemplified in connection with a power plant for a railway car equipped with a plurality of motors 11 and 12 and variable speed transmissions driven by the motors respectively. By using two motors, which can be individually or conjointly operated, economy results, because when the vehicle is under a light load, it is only necessary to use one motor to propel it. In this practice, it is customary to drive one axle $a$ of the front truck by one motor through a variable speed transmission 14, and to drive one of the axles of the rear truck by another motor through a second variable speed transmission. Inasmuch as the transmissions and motors are intended for separate and conjoint or cumulative driving, it has not been possible to control both transmissions from a common controller lever or device, because the gears in the idle transmissions would, at times at least, prevent the shifting of the controller lever to the position desired. The present invention provides means for automatically rendering the gear-shift lever ineffective to shift either of the transmissions, while the motors which drive them are idle, and for rendering it effective for that purpose, while the motors are running. As a result, the manipulation of the gear shift lever will never be interfered with by an idle transmission, and it will control either one or both of the transmissions. Each of the motors, 11, 12, is connected through variable speed gearing 14ª to drive a shaft 15. These gearings may be of any suitable construction and are each contained in a case 14. Each shaft 15 is connected to drive one of the car axles through a universal joint 16 and gearing, as well understood in the art. The gear changes in each transmission are effected by a pair of shifter-forks 17 and 18 (Fig. 4) which are fixed respectively to shafts 19 and 20 which are longitudinally slidable in the transmission case 14. By shifting these forks in opposite directions from their central or neutral position (Fig. 5), four gear changes may be effected, as well understood in the art.

The shifting mechanism for the fork 17 of each transmission comprises an arm 22 which is loosely mounted on a shaft 23 which is journalled in an auxiliary case 24 mounted on top of the gear-case 14. The shifting mechanism for the gear-shifter fork 18 of each transmission comprises an arm 25 which is loosely mounted on a sleeve 26 which is journalled in case 24 and fits around the shaft 23. Arm 22 is adapted to be rocked from shaft 23 by an arm 27, which is keyed to said shaft, and a pin 28 which is slidable in arm 22 and is adapted to enter a hole 29 in arm 27 to lock said arms together for conjoint movement. A spring 30 normally withdraws the pin 28 from hole 29 and into its disengaged position, so that arm 22 will not be operable by arm 27 until the pin has been shifted against the force of said spring. Arm 25, which shifts the fork 18, is adapted to be rocked with sleeve 26 by means of an arm 32 which is keyed to said sleeve and a stud or pin 33 which is slidably held in arm 25 and is adapted to enter a hole 34 in arm 32 to lock arms 25 and 32 together. A spring 35, normally withdraws pin 33 from hole 34. A longitudinally extending shaft 36 is notched to provide flat surfaces 37 so that when the shaft is in one of its positions, it will permit pins 28 and 33 to be retracted by their respective springs to render the arms 22 and 25 inoperable by shaft 23 and sleeve 26. When shaft 36 is rotated to another of its positions, it will force said pins outwardly into their locking positions, so as to render arms 22 and 25 operable by shaft 23 and sleeve 26. Each of the arms 27 and 32 is yieldingly held in its central or neutral position to prevent accidental shift by a pin 40 which has a convexed inner end to enter the outer end of the locking holes in said arm, and is frictionally pressed against its associated arm by a spring 41. Each pin 40 and its spring 41 are enclosed in a head 42 which is removably secured to one side of casing 24 and provided with a screw 44 to engage the outer end of the spring 41.

A gear-shift lever 47, located in the control cab of the car, is journalled for universal movement in a socket 48 which is usually fitted into the floor of the cab. To provide for this universal movement, a member 49, having a spherical periphery, is fixed to the shank of lever 47 and is mounted in correspondingly shaped bearings 50 and 51 in the socket 48 and a cap plate 52 respectively. Pivot pins 53 extend into vertical grooves 54 in member 49 to guide the lever in its universal movement. The upper end of lever 47 is provided with a handle 55 and its lower end is provided with a ball 56, which, by transverse shift of the lever in its neutral position, is adapted to be shifted into a notch 57 of a fixed locking bar 58 whereby the lever will be held against fore-and-aft shift. Ball 56 is also shiftable laterally into a notch 59 in a bar 60 which is longitudinally slidable so that it may be shifted to either side of its neutral position to control two of the gearings for two speeds of the transmission. The ball 56 can also be swung into a notch 61 formed in a longitudinally slidable bar 62, which, by fore-and-aft movement, controls two different speed changes in the transmissions. Bars 58, 60 and 62 are held adjacent the lower end of socket 48 by a retainer plate 63.

The lever-controlled bar 60 is connected by a rod 64 to an arm 65 which is fixed to the outer end of the sleeve 26 of one of the transmission controlling devices, and said arm is connected to effect conjoint shift of the arm 65 which is fixed to the sleeve 26 of the second transmission controlling device, by means of a link 66, a lever 67, which is centrally pivoted as at 68 to the car body, and a link 69 between said lever and said other arm 65. As a result of this construction, when the gear-shift lever 55 is operated to shift the controller bar 60 into position to effect either of two gear changes, it will operate arms 65 and sleeves 26 of both of the transmission controlling devices. Bar 62 is connected by a rod 70 to an arm 71 which is fixed to the shaft 23 of the control for one of the transmissions and to the corresponding arm 71 on the shaft 23 of the other transmission control by means of a rod 73 connected to the first arm 71, a lever 74 which is centrally pivoted at 68 to the car body and a rod 76 between said lever and the second arm 71. This mechanism exemplifies a construction in which a single lever is adapted to shift the controlling devices for a plurality of variable speed transmission gearings, and in which the shifting forks are normally disconnected from or inoperative by the operator's gear-shift lever.

The connections between the gear-shift lever and the shifter forks of the transmissions for effecting speed changes are rendered effective by rotation of shafts 36 respectively, and these shafts are controlled and operated by the motors which drive the transmission gearings respectively. For this purpose, each shaft 36, which is journalled in the auxiliary casing 24, has connected thereto an arm 77 which is operatively connected by a rod 78 to a diaphragm 79 which is clamped between a casing composed of sections 80 and 81. The side of the diaphragm 79, adjacent the casing section 81, is exposed to atmosphere, and the opposite side, which is enclosed by section 80, is exposed to suction controlled by the operation of the engine. Pipes 82, each of which has one of its ends connected to the intake manifold of one of the motors, has its other end connected to the outer side of one of the casing sections 80, so that while the motor associated with either transmission is idle, the diaphragm 79, associated with the control for that transmission, will not be subjected to suction, and will hold rod 78 in such position, that the flat surfaces 37 of shaft 36 will be in position to permit the spring-pressed pins 33 to remain in their released position. When the motor is started, the suction produced in the intake-manifold of the ordinary four-cycle type of motor will operate diaphragm 79 to shift rod 78 and rock arm 77 to impart approximately a quarter turn to shaft 36, so that the shaft will shift the pins 33 outwardly to cause one of said pins to lock arms 25 and 32 together, and the other of said pins to lock arms 22 and 27 together. At all times while the motor is running, shaft 36 will be held in position to hold pins 33 in their locked positions to render arms 22 and 25 operable by the gear-shift lever 47. Resultantly, when either of the motors stops running, the transmission gearing operated by said motor will be disconnected from the gear-shift lever, so that the manipulation of the lever will not affect the transmission-gearing connected to the idle motor. If one of the motors should stop while the gear-shift lever is in any but its neutral position, the pins 33 will remain in position to lock the pair of arms together until the gear-shift lever is shifted into its neutral position, when the flat faces or notches 37 in shaft 36 will release the pins. These faces 37 can release these pins only when all of the associated arms are in their neutral position.

It is desirable to make provision for rendering the shifter arms 22 and 25 of each transmission mechanism operative by the gear-shift lever, in event the suction-operated device should become inoperative. For this purpose, an arm 86 is fixed to a projecting end of the shaft 36, and is provided with a screw-stud 87 which is adapted to enter a recess 88 in a plate 89 to lock the shaft 36 in position to keep the pins 33 in their operative positions.

The operation of the mechanism is as follows: Transmission gearings connected to both of the motors are conjointly controlled by the gear-shift lever 47. When both motors are running, the shafts 36 for controlling the transmissions respectively will both be in position, as the result of the suction acting upon the diaphragm 79, to force the pins 33 outwardly to interlock the arms 25, 32 and arms 22 and 27 of each of the transmission controls respectively. As a result, the gear shift lever will conjointly operate the gear-shift forks 17 and 18 to effect corresponding gear changes in both of the transmission gearings. When but a single motor is running, the control of the transmission gearing connected to that motor will be disconnected from the gear-shift lever 47, because the suction in that motor will not operate the diaphragm 79 to rock shaft 36 into position to lock the arms for controlling the shifter forks. In other words, the arms 25 and 32 and arms 27 and 22 will be disconnected so that the manipulation of the gear-shift lever 47 will have no effect on the gear shifter forks 17 and 18 of the transmission for the idle motor. This occurs in connection with either of the transmissions, so that the gear-shift responsive to lever 47 is dependent upon the operation of the motors respectively. If both motors are running, both transmissions will be subject to control of the gear shift lever 47. If either motor is idle, the transmission gearing for that motor will be disconnected from the gear-shift lever 47, so that its manipulation will effect only gear changes in the transmission for the running motor.

The invention exemplifies controlling mechanism for transmission gearings in which provision is made for automatically rendering either one or a plurality of transmission gearings operable responsively to control through a single gear shift lever or controlling device. The operator, by the manipulation of a single lever, will control the propulsion of the vehicle while it is being driven either by a single or a plurality of motors, the shifting devices for the transmission of an idle motor being automatically disconnected from the gear shift lever so that the operator may control the car from a single gear shift lever, regardless of whether the car is being propelled by one or a plurality of motors.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In propelling mechanism, the combination with a plurality of motors and variable transmission gearings driven by the motors respectively, of a manually operable gear shifting device, and means, controlled by one of the motors between said device and one of the transmission gearings whereby the device will be rendered effective or ineffective to shift the latter gearing.

2. In propelling mechanism, the combination with a plurality of motors and variable transmission gearings driven by the motors respectively, of a manually operable gear shifting device, and means, controlled by the motors respectively, between said device and the transmission gearings respectively, whereby the device will be rendered effective or ineffective to shift the gearings respectively.

3. In propelling mechanism, the combination with a plurality of motors and variable transmission gearings driven by the motors respectively, of a manually operable gear shifting device, and fluid-operated means, controlled by one of the motors between said device and one of the transmission gearings, whereby the device will be rendered effective or ineffective to shift the latter gearing.

4. In propelling mechanism, the combination with a plurality of motors and variable transmission gearings driven by the motors respectively, of a manually operable gear shifting device, and fluid operated means, controlled by the motors respectively, between said device and the transmission gearings, whereby the device will be rendered effective or ineffective to shift the gearings respectively.

5. In propelling mechanism, the combination with a plurality of motors and variable transmission gearings driven by the motors respectively, of a manually operable gear-shift lever, connections between said lever and the transmission gearings, and means, controlled by one of the motors, for rendering the lever effective or ineffective to shift one of the transmission gearings.

6. In propelling mechanism, the combination with a plurality of motors and variable transmission gearings driven by the motors respectively, of a manually operable gear-shift lever, connections between said lever and the transmission gearings, and fluid-operated means, controlled by one of the motors, for rendering the lever effective or ineffective to shift one of the transmission gearings.

7. In propelling mechanism, the combination with a plurality of motors and variable transmission gearings driven by the motors respectively, of a manually operable gear shift lever, connections between the lever and the transmission gearings, and means, controlled by the motors respectively, whereby the lever may be rendered effective or ineffective to shift either of the gearings.

8. In propelling mechanism, the combination with a plurality of motors and variable transmission gearings driven by the motors respectively, of a manually operable gear shift lever, connections between the lever and the transmission gearings, and fluid operated means, controlled by the motors respectively, whereby the lever may be rendered effective or ineffective to shift either of the gearings.

9. In propelling mechanism, the combination with a plurality of motors and variable transmission gearings driven by the motors respectively, of a manually operable gear-shift lever, connections between said lever and the transmission gearings, and means, controlled by the motors respectively, for rendering the lever effective or ineffective to shift either or both of the transmission gearings.

10. In propelling mechanism, the combination with a plurality of motors and variable transmission gearings driven by the motors respectively, of a manually operable gear-shift lever, connections between said lever and the transmission gearings, and fluid operated means, controlled by the motors respectively, for rendering the lever effective or ineffective to shift either or both of the transmission gearings.

11. In propelling mechanism, the combination with a plurality of motors and variable transmission gearings driven by the motors respectively, of a manually operable gear-shift device, means, controlled by the motors respectively, between said device and the transmission gearings for rendering the device effective or ineffective to shift the gearings, and means for locking said means non-responsive to the motors.

12. In propelling mechanism, the combination with a motor and variable transmission gearing driven by the motor, of a manually operable gear-shift device, means, controlled by the motor, to render the device effective or ineffective to shift the gearing, and means for locking said means to render it non-responsive to the motor.

13. In propelling mechanism, the combination with a motor and variable transmission gearing operated by the motor, of a manually operable device for shifting said gearing, and means whereby the device will be rendered effective and ineffective to shift the transmission, responsively to the operation of the motor.

14. In propelling mechanism, the combination with a motor and variable transmission gearing operated by the motor, of a manually operable device for shifting said gearing, and fluid operated means whereby the device will be rendered effective and ineffective to shift the transmission controlled by the operation of the motor.

15. In propelling mechanism, the combination with a motor and variable transmission gearing operated by the motor, of a manually operable gear-shift lever for shifting the transmission gearing, and means, controlled by the motor, for rendering the lever operative to adjust said gearing while the motor is running and to render it inoperative for that purpose when the motor is stopped.

16. In propelling mechanism, the combination with a motor and variable transmission gearing operated by the motor, of a manually operable gear-shift lever for adjusting the transmission gearing, and fluid-operated means, controlled by the motor, for rendering the lever operative to adjust said gearing while the motor is running and to render it inoperative for that purpose when the motor is stopped.

17. In propelling mechanism, the combination with a motor and variable transmission gearing operated by the motor, of a manually operable lever for changing the gearing, a connection between the lever and said gearing, and a device controlled by the motor for rendering the connection operative and inoperative to change the gearing.

18. In propelling mechanism, the combination with a motor and variable transmission gearing operated by the motor, of a manually operable lever for changing the gearing, a connection between the lever and said gearing, and a suction-operated device controlled by the motor, for rendering the connection operative and inoperative to change the gearing.

19. In propelling mechanism, the combination with a motor and variable transmission gearing operated by the motor, of a manually operable gear-shift lever, a connection between the lever and the gearing comprising a pair of concentrically mounted arms, means for locking the arms together to render the connection effective to adjust the transmission gearing, and means controlled by the motor for controlling the locking means.

20. In propelling mechanism, the combination with a motor and variable transmission gearing operated by the motor, of a manually operable gear-shift lever, connections between the lever and the gearing comprising plural pairs of concentrically mounted arms, means for locking the arms of the pairs together to render the connections effective to adjust the transmission gearing, and means controlled by the motor for controlling the locking means.

21. In propelling mechanism, the combination with a motor and variable transmission gearing operated by the motor, of a manually operable gear-shift lever, connections between the lever and the gearing comprising plural pairs of concentrically mounted arms, means for locking the arms of the pairs together to render the connections effective to adjust the transmission gearing, and means, controlled by the motor, comprising a shaft for shifting the locking means.

22. In propelling mechanism, the combination with a motor and variable transmission gearing operated by the motor, of a manually operable gear-shift lever, and connections between the lever and the transmission gearing comprising a pair of concentrically mounted arms, means for locking the arms together to render the connection effective to adjust the transmission gearing, and means, controlled by the motor, for operating the locking means, said locking means being operable to lock the arms only when the lever is in its neutral position.

Signed at Chicago, Illinois, this 24th day of November, 1925.

LEE W. MELCHER.